United States Patent
Pavani

(10) Patent No.: US 9,319,597 B2
(45) Date of Patent: *Apr. 19, 2016

(54) SYSTEM AND METHOD FOR COLOR IMAGING UNDER LOW LIGHT

(71) Applicant: ARECONT VISION, LLC., Glendale, CA (US)

(72) Inventor: Sri Rama Prasanna Pavani, Los Angeles, CA (US)

(73) Assignee: ARECONT VISION, LLC., Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,305

(22) Filed: May 12, 2015

(65) Prior Publication Data
US 2015/0244922 A1 Aug. 27, 2015

Related U.S. Application Data

(63) Continuation of application No. 14/079,446, filed on Nov. 13, 2013, now Pat. No. 9,071,764.

(51) Int. Cl.
| | | |
|---|---|---|
| *H04N 5/235* | (2006.01) | |
| *H04N 9/07* | (2006.01) | |
| *H04N 9/64* | (2006.01) | |
| *H04N 9/73* | (2006.01) | |

(52) U.S. Cl.
CPC .......... *H04N 5/2354* (2013.01); *H04N 9/07* (2013.01); *H04N 9/646* (2013.01); *H04N 9/735* (2013.01); *H04N 2209/043* (2013.01); *H04N 2209/044* (2013.01)

(58) Field of Classification Search
CPC ....... H04N 5/2354; H04N 9/646; H04N 9/07; H04N 2209/044; H04N 2209/043
USPC .......................................................... 348/217
See application file for complete search history.

(56) References Cited

U.S. PATENT DOCUMENTS

| | | | |
|---|---|---|---|
| 4,845,553 A | 7/1989 | Konomura et al. | |
| 5,264,925 A | 11/1993 | Shipp et al. | |
| 5,523,786 A | 6/1996 | Parulski | |
| 9,071,764 B2* | 6/2015 | Pavani | H04N 9/646 |
| 2005/0128751 A1* | 6/2005 | Roberge | F21K 9/00 362/276 |
| 2010/0141811 A1 | 6/2010 | Gotanda | |
| 2010/0194291 A1 | 8/2010 | Ishiwata | |
| 2010/0213259 A1 | 8/2010 | Gao | |
| 2012/0274775 A1* | 11/2012 | Reiffel | G06Q 30/08 348/158 |
| 2013/0027596 A1 | 1/2013 | Wan | |

* cited by examiner

*Primary Examiner* — Gevell Selby
(74) *Attorney, Agent, or Firm* — Lewis Roca Rothgerber Christie LLP

(57) ABSTRACT

A camera for enhanced color imaging in a low light environment including: one or more illuminators for illuminating a R, a G, and a B light at different time periods; an image sensor for capturing R G and B image frames; and a processor configured to generate an intermediate color frame from each of the R, G and B image frames; determine moving pixels in the each of the intermediate color frames; determine a true color for the moving pixels in each intermediate color frame; generate a true color frame for each intermediate color frame by substituting color of the moving pixels with respective true colors of the moving pixels, in intermediate color frame; calculate scene color metrics from the true color frame or intermediate color frame; and adaptively adjust illumination of one or more of the R, G, and B lights to enhance a next frame.

19 Claims, 6 Drawing Sheets

| Frame | Red LED | Green LED | Blue LED |
|-------|---------|-----------|----------|
| Red   | ON      | OFF       | OFF      |
| Green | OFF     | ON        | OFF      |
| Blue  | OFF     | OFF       | ON       |
| Dark  | OFF     | OFF       | OFF      | t
t+1
t+2
t+3

FIG. 2

SYSTEM AND METHOD FOR COLOR IMAGING UNDER LOW LIGHT

CROSS-REFERENCE TO RELATED APPLICATIONS

This Patent Application is a continuation of U.S. application Ser. No. 14/079,446, filed Nov. 13, 2013, now issued as U.S. Pat. No. 9,071,764, the entire contents of which are hereby expressly incorporated by reference.

FIELD OF THE INVENTION

The present invention relates to image processing and more particularly to a system and method for enhancing color imaging under low light.

BACKGROUND

Video/image processing in a low light environment introduces a tension or tradeoff between noise and motion. The low number of photons in the low light environment produces noisy images, especially noisy color images. Increasing the exposure time of a camera to allow collection of more photons reduces noise, but large exposure time values could increase motion blur due to potential object motion within the exposure period. Several solutions have been proposed to remedy color imaging in a low light environment, such as a 0 lux environment. For example, a variety of external light illuminators have been proposed, such as monochrome, (infrared) IR, or white light illuminators.

There are a number of problems with typical external illuminators. For example, the IR illuminators do not enable the detection of color images. Although white light illuminators combined with color image sensors allow color detection, they suffer from a very low optical efficiency due to wastage of majority of the light collected by the camera lens in the color image sensors. This low optical efficiency is particularly undesirable in situations where the electrical power available to the illuminator is limited. For instance, the illuminator power in a network camera is limited by the IEEE Power over Ethernet specifications and therefore the brightness of the external illuminators would be limited. Moreover, the illumination spectrum and intensity of IR and white light illuminators are not adaptive to scene requirements.

Virtually, all color cameras are equipped with a Bayer filter to detect color. A Bayer filter is a color filter array for arranging red, green, and blue color filters on a grid of photo sensors. Typically, the filter array has more green filters than red and blue. For example, a Bayer filter array could have 50% green, 25% red and 25% blue filters. This arrangement of color filters creates a color image from, for example, digital cameras. However, by its nature, each pixel with a color filter allows only about 20% of neutrally colored light entering the camera to be detected. This is mainly because a filter of a given primary color is designed to block other primary colors from being detected. For instance, a red filter blocks green and blue light; a green filter blocks red and blue light; and a blue filter blocks red and green light. This low efficiency of the light detection becomes very significant in a low (or zero lux) light environment. Moreover, due to low light efficiency, the color images appear noisy. This is because the signal to noise ratio of color images decrease with decreasing light levels. Additionally, Bayer filter based color sensors may exhibit substantial color signal crosstalk because of leakage between the neighboring pixels. This is especially a problem in cameras that use large apertures (small F/#) due to the high cone angle of the light entering the pixels. Further, Bayer filter based color imagers do not detect all three (red, green, blue) colors at each pixel. This drawback is typically compensated by using an image processing procedure called as demosaicing, which leads to degradation in spatial resolution.

Accordingly, there is a need for an enhanced video image processing technique that decreases noise and color artifacts, while minimizing motion blur and resolution degradation, without requiring a complex architecture, large memory, and/or high bandwidth.

SUMMARY

The present invention is a system and method for enhanced color imaging in a low light environment.

In some embodiments, the present invention is a method for enhanced color imaging in a low light environment. The method includes: illuminating a red (R), a green (G), and a blue (B) light at different time periods; capturing an R image frame, a G image frame and a B image frame, response to the illumination; generating an intermediate color frame for each of the R, G and B image frames; determining moving pixels in the each of the intermediate color frames; determining a true color for the moving pixels in each intermediate color frame; generating a true color frame for each intermediate color frame by substituting color of the moving pixels with respective true colors of the moving pixels, in each intermediate color frame; calculating scene color metrics of the true color frame for each intermediate color frame; and adaptively adjusting illumination of one or more of the R, G, and B lights to enhance a next frame.

In some embodiments, the present invention is a camera for enhanced color imaging in a low light environment. The camera includes: a lens; one or more illuminators for illuminating a red (R), a green (G), and a blue (B) light at different time periods; an image sensor for capturing an R image frame, a G image frame and a B image frame, response to the illumination; and a processor configured to generate an intermediate color frame from each of the R, G and B image frames; determine moving pixels in the intermediate color frame; determine a true color for the moving pixels in intermediate color frame; generate a true color frame for intermediate color frame by substituting color of the moving pixels with respective true colors of the moving pixels, in intermediate color frame; calculate scene color metrics of the true color frame from intermediate color frame or true color frame; and adaptively adjust illumination of one or more of the R, G, and B lights to enhance a next frame.

In some embodiments, the present invention is a method for enhanced color imaging in a low light environment. The method includes: illuminating a first color, a second color, and a third color light at different time periods; capturing a first color image frame, a second color image frame and a third color image frame, response to the illumination; generating an intermediate color frame from each of the first, second and third color image frames; determining moving pixels in the intermediate color frame; determining a true color for the moving pixels in intermediate color frame; generating a true color frame for intermediate color frame by substituting color of the moving pixels with respective true colors of the moving pixels, in intermediate color frame; calculating scene color metrics of the true color frame for intermediate color frame or true color frame; and adaptively adjusting illumination of one or more of the first color, second color, and third color lights to enhance a next frame. The first color, the second color, and the third color lights may be red, blue and green lights, respectively; or yellow, magenta, and cyan lights, respectively; or any other three non-identical colors.

In some embodiments, the illuminations of the color lights are turned off for a time period to generate a dark (D) frame, and the D frame is subtracted from each of the color frames to compensate for ambient lighting and generate an intermediate color frame.

BRIEF DESCRIPTION OF THE DRAWINGS

FIG. 2 is an exemplary state diagram for a multicolor illuminator, according to some embodiments of the present invention.

DETAIL DESCRIPTION

Figure 1C:
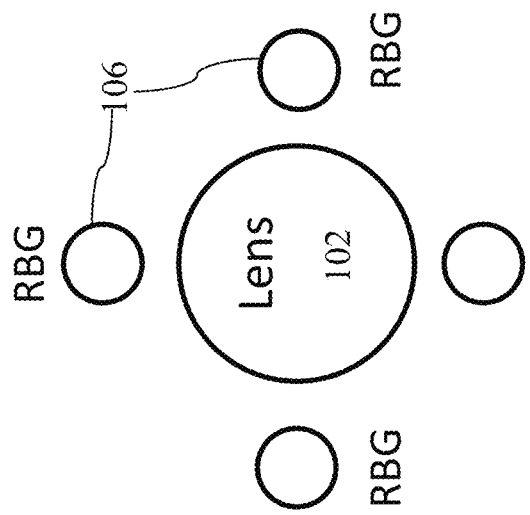
FIGS. 1A, 1B and 1C are exemplary block diagrams of camera lenses including one or more multicolor illuminators, according to some embodiments of the present invention.
Figure 1B:
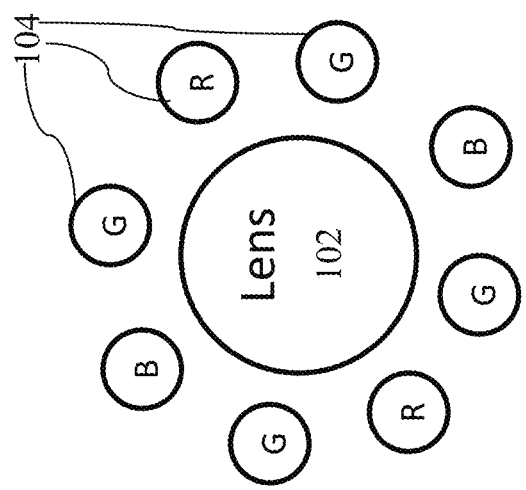
Figure 1A:
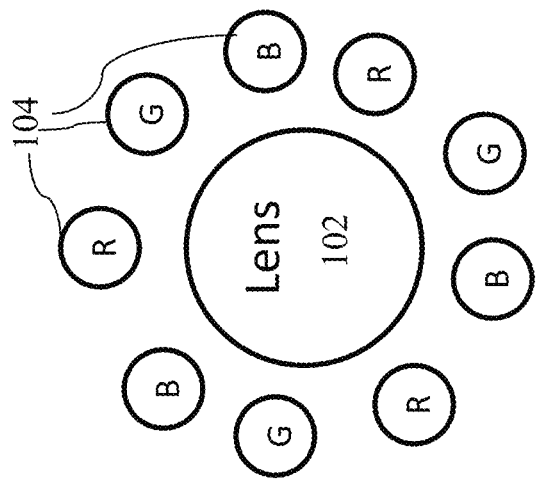

FIGS. 1A, 1B and 1C are exemplary block diagrams of camera lenses including one or more multicolor illuminators, according to some embodiments of the present invention. In some embodiments, the present invention is a system and method for an enhanced color imaging, especially, in a low light environment. In some embodiments, a multicolor light illuminator is added to a camera with a monochrome sensor near the lens 102. As shown in FIG. 1C, the multicolor illuminator includes one or more LEDs 106 that are capable of changing color to the primary colors of red (R), green (G) and blue (B). Alternatively, three single-color LEDs of the red, green and blue may be used. The LED(s) would cycle through the three colors and optionally, a dark (D) cycle, at consecutive times to have the image sensor pick up a red frame, a green frame, a blue frame, and optionally a dark (D) frame. Other types of low power illuminators such as laser diodes are also within the scope of the present invention. In some embodiments, the multicolor illuminator includes a feedback loop to adaptively control the illumination intensity and spectrum based on feedback from the current true color (output) frame, for example, based on color statistics of the current true frame.

FIG. 1A depicts an equal number of R, G, B illuminators 104 surrounding a lens 102. In FIG. 1B, the number of G illuminators 104 are more than (for example twice) the number of R, B illuminators 104, since the G color is more visible to human eyes. As illustrated in FIG. 1C, the R, G, B illuminators are combined in a single package illuminator 106. In some embodiments, the field of view of the illuminator(s) is matched to a field of view of the lens to more efficiently detect the light.

As a result, the present invention achieves over four times better light detection efficiency than the traditional approaches and over three times higher spatial resolution due to lack of a Bayer color filter. The increased light detection efficiency is because of the lack of light loss in color filters. The increased spatial resolution is because, unlike a Bayer color sensor, every pixel of the present invention detects all three (red, green, and blue) primary colors. In a Bayer sensor, an individual pixel can only detect one of the three primary colors.

Considering the sensor as a whole, a subset of the total sensor pixels detects red, another subset detects green, and a third subset detects blue. An interpolation process called as demosaicing is then typically used in Bayer color sensors to estimate each of the three colors at every pixel of the imager. This interpolation process results in reduced spatial resolution than the native resolution of the sensor. The proposed invention avoids this resolution degradation by transferring the task of color selection from the image sensor to the illuminator. i.e., by using a multicolor illuminator and a monochrome image sensor. Moreover, the multicolor illuminator that effectively replaces the Bayer filter can be more readily manufactured with different spectral profiles than commercially available colors in the Bayer filter. In some embodiments, since time modulating the multicolor illuminator could cause perceptible flicker, the frame rate is adjusted to be more than 75 fps to make the flicker imperceptible.

FIG. 2 is an exemplary state diagram for a multicolor illuminator, according to some embodiments of the present invention. As shown, at time t, only the red color illuminator is on and the green and blue colors are off. At this time, a red frame is captured by the sensor. At time t+1, only the green color illuminator is on and the red and blue colors are off. This results in capturing a green frame by the sensor. Similarly, at time t+2, only the blue color illuminator is on and the green and red colors are off, which results in capturing a blue frame. At time t+3, all of the colors are off to have a "dark" frame captured. The optional dark frame is used to account for ambient lighting by subtracting the dark color from each of the color frames. This method has the advantage of capturing three separate color (red, green, and blue) frames, instead of one multiplexed color frame containing all three colors. This way, there is no need for demosaicing of the frames. A demosaicing process is a digital image processing step used to reconstruct a full color image from the incomplete color samples output from an image sensor overlaid with a color filter array.

Figure 3:
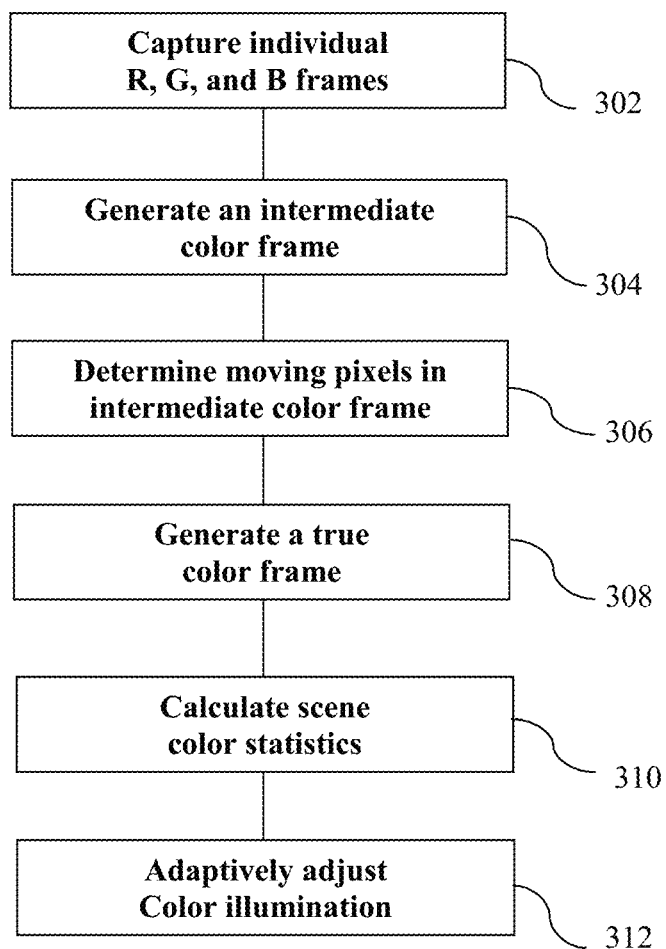
FIG. 3 is an exemplary process flow, according to some embodiments of the present invention.

FIG. 3 is an exemplary process flow, according to some embodiments of the present invention. In block 302, individual R, G, B, and optionally, D frames are captured by the image sensor. As described above, with respect to FIGS. 1 and 2, the frames are captured by illuminating R, G and B colors sequentially at different times. In other words, R frame is detected with R LED ON and G and B LEDs OFF. Similarly, G and B frames are detected with only their respective colored LED ON. Optionally, D frame is detected with all LEDs off. In some embodiments, where there is no ambient lighting, a D frame is not detected. Moreover, a D frame may be detected for some portion of the video image and not detected in other portions of the video image, as described later. In some embodiments, the presence or absence of ambient light is ascertained from a D frame acquired at a previous time.

In block 304, an intermediate color frame (Cit) is generated by using {R-D, G-D, B-D} frames as the {Ri,Gi,Bi} color components of Cit. That is, the D frame (if any) is subtracted from the R, G and B frames to compensate for ambient lighting. This intermediate color frame Cit is the first estimate of the true color image before motion compensation. In other words, the intermediate frame serves two purposes: first, it acts as a first estimate for true color frame (described below) and second, it compensates ambient lighting. However, if a D frame is not detected, ambient light compensation is not performed, but an intermediate color frame is still generated by using R, G, and B frames.

In block 306, the moving pixels in Cit frame are determined, for example, by calculating the sum of absolute differences of Cit frame and Ct−1 frame, where the Ct−1 frame is the generated true color frame from a previous time. Moving regions of image are likely to have color artifacts in the intermediate color frame Cit.

In block 308, a true color image for time t (Ct) is generated, by replacing color pixels in moving regions of Cit with their true color. That is, the true color image is generated by replacing the incorrect (artifact) colors in moving regions (pixels) of the image with their true colors. Since non-moving pixels of the intermediate color image have accurate color information, the true color of a moving pixel can be estimated by identifying the most prominent color in the neighborhood of the moving pixel. In some embodiments, the true color of a moving pixel is determined as the majority color of the moving pixel's non-moving neighborhood. To this end, a neighborhood region of a moving pixel is first selected. In some embodiments, the size of the neighborhood is adaptively varied until a statistically significant value for true color is determined. For example, in cases where the moving pixel under consideration is surrounded by large number of other moving pixels, final size of the non-moving neighborhood is determined by increasing the neighborhood region (current) size until enough (a predetermined number of) non-moving pixels with similar colors are detected. Optionally, the resolutions of the true color frames (R, G, B) may be enhanced, as described below with respect to FIG. 4.

In block 310, some scene color metrics, for example scene color statistics, is calculated. Scene color metrics may include the total number of pixels and the energy of individual colors (R, G, B) in the image, or some weighted average of the same. The scene color metric is designed to quantify the spectral profile of the scene. For example, the scene color metrics could involve the computation of sum of all pixel values in red frame, sum of all pixel values in green frame, and sum of all pixel values in blue frame. In another instance, such a scene color metric may be computed after the D frame is subtracted from the R, G, and B frames. This information could be used to adaptively control color illumination levels to generate better image quality.

In block 312, the brightness, and/or duty cycle of one or more of the colors of R, G, and B are adaptively adjusted to enhance image quality under low-light. The exposure times of the R, G, B frames may also be adjusted. For example, if B image is found to be noisy, B illumination could be increased to reduce noise. As another example, a scene with less reflectance in blue color produces a noisy blue image, which can be compensated by increasing the brightness of the blue illuminator. Yet in another example, the D frame may be skipped for a current input frame if it is determined that there is no (or a negligible amount of) ambient light, which can be determined from a previous D frame. Further, the spectrum of the illumination could be matched to the spectrum of the scene, estimated from scene statistics, to maximize image quality.

In some embodiments, in addition to or in lieu of the R, G, and B lights, a yellow, a magenta, and a cyan light may be illuminated at different time periods. In some embodiments, the intermediate and true color frames are formed from yellow, cyan, and magenta frames. In some embodiments, the yellow color is illuminated by turning on R and G illuminators simultaneously; magenta color is illuminated by turning on R and B illuminators simultaneously and cyan color is illuminated by turning on G and B illuminators simultaneously.

Figure 4:
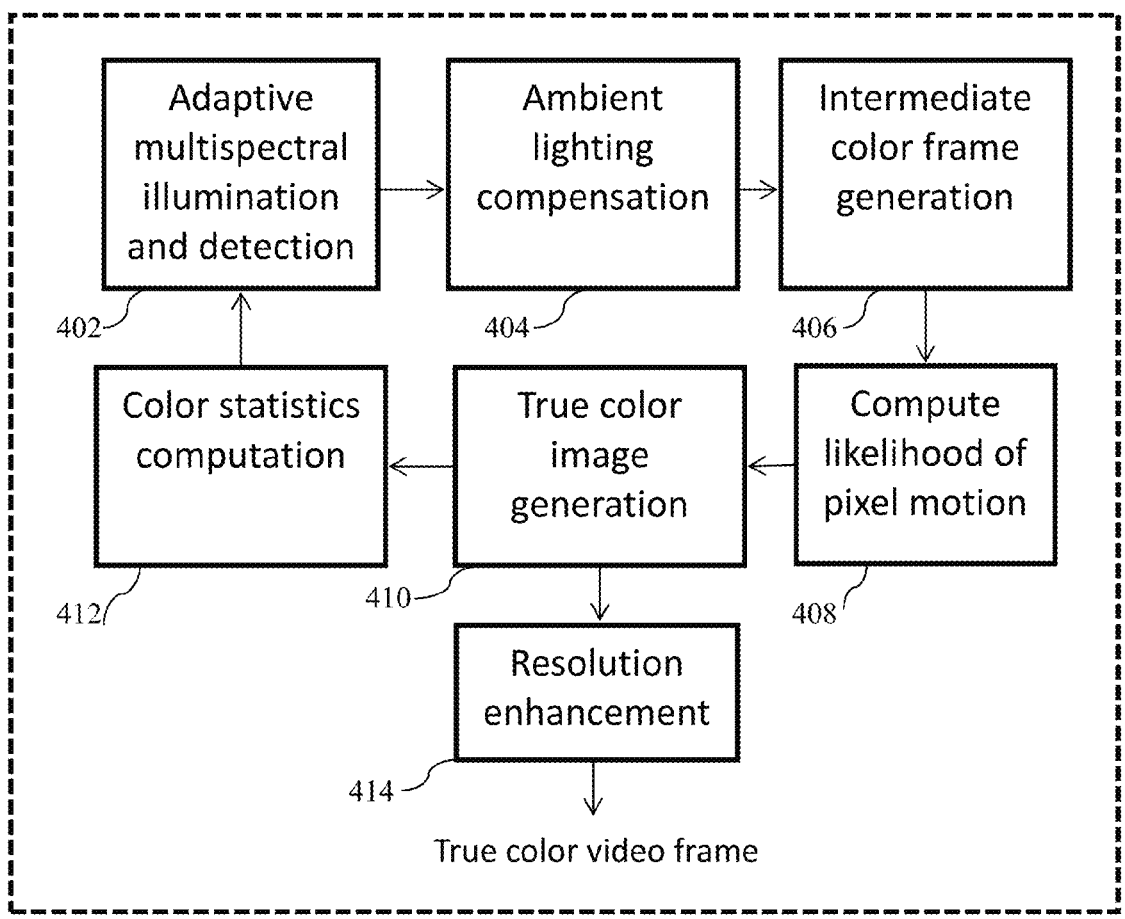
FIG. 4 is an exemplary block diagram, according to some embodiments of the present invention.

FIG. 4 is an exemplary block diagram, according to some embodiments of the present invention. Block 402 is the structure for detecting and adaptively controlling a multispectral (multicolor) illumination. In some embodiments, this may include a camera having a lens and an image sensor, a multicolor (multispectral) light illuminator, and a feedback loop to adaptively adjust the illumination levels of the multicolor light illuminator. As described above, the multicolor light illuminator sequentially illuminates R, G, and B colors and optionally, includes a dark (no illumination) cycle. The image sensor then captures R, G, and B frames, and optionally a D frame and outputs the captured frames to the ambient light compensation module 404. The ambient light compensation module 404 calculates an intermediate color frame (Cit) by compensating the D frame (if any) from the R, G and B frames ({R-D, G-D, B-D}) to compensate for ambient lighting. This module may include software, firmware and/or associated electronic circuits to subtract the frames and generate the new (intermediate) frames by block 406. The intermediate color frame generation block generates a color frame from the ambient light compensated R, G, and B frames. The intermediate color frame could be formed in one of many color spaces such as RGB or YCbCr.

In other words, block 404 compensates individual R, G, B for ambient lighting, for example by subtracting D frame, while block 406 takes such ambient compensated frames and forms a color image in a predetermined color space. Different color spaces, such as RGB and YCbCr, exist for representing color images.

Block 408 computes the likelihood of pixel (or region) motion from the intermediate color frames. The moving pixels may be determined by any methods known in the art. For example, by subtracting a current (intermediate) frame from a previous (true color) frame to identify the pixels that are present in the current frame, but not in the previous frame. In some embodiments, the sum of absolute differences of Cit frame and Ct−1 frame is calculated to determine the moving pixels in the current (intermediate) frame. The matrix representing the sum of absolute differences shows high values for pixels that are in motion and low values for pixels that are stationary. In some instances, a threshold may be employed to separate moving pixels from non-moving pixels. The threshold value may be determined based on the amount of noise present in the respective image frames. Block 408 may include a processor, associated memory, firmware, software and/or electronic circuits to subtract the current (intermediate) frame from the previous (intermediate) frame and compute the likelihood of pixel motion.

The true color generation block 410 computes (generates) the true color frame from the moving pixels by correcting (artifact) colors in moving pixels in moving regions (pixels) of the image. In some embodiments, the true color of a moving pixel is determined as the majority color of the moving pixels' non-moving neighborhood and the true color image is generated by replacing the colors in moving pixels with their true colors. Similar to block 408, block 410 may include a processor, associated memory, firmware, software and/or electronic circuits to determine the true color of a moving pixel and replace their (incorrect) color by their true color. In some embodiment, block 410 may utilize the processor and associate firmware and software of block of block 408 to perform its processes.

The resolutions of the true color frames (R, G, B) are then enhanced by block 414. The resolution enhancement block increases the number of pixels in the true color frame to match the interpolation factor of the demosaicing process traditionally performed with Bayer image sensors. Typically, this block enhances resolution by a factor of 3. A variety of image processing algorithms, such as dictionary learning, nearest neighbor interpolation, and bicubic interpolation may be used for enhancing resolution. Block 412 computes the color metrics, such as statistics, of the true color image frame and based on the metrics provides feedback to block 402, so that the illumination for the next color frame may be adaptively changed. In some embodiment, multiple cameras, each including a multicolor illuminator, may be synchronized to avoid color crosstalk. The synchronization is performed to have individual cameras in close proximity to turn ON their similarly colored LEDs at the same time. In this way, a red frame of one camera may not be corrupted by the green or blue light from a neighboring camera. Such synchronization may be implemented by having the cameras either listen to an external time reference, for example provided by the network time protocol. Custom time protocols may also be implemented in situations where external references are unavailable.

Figure 5:
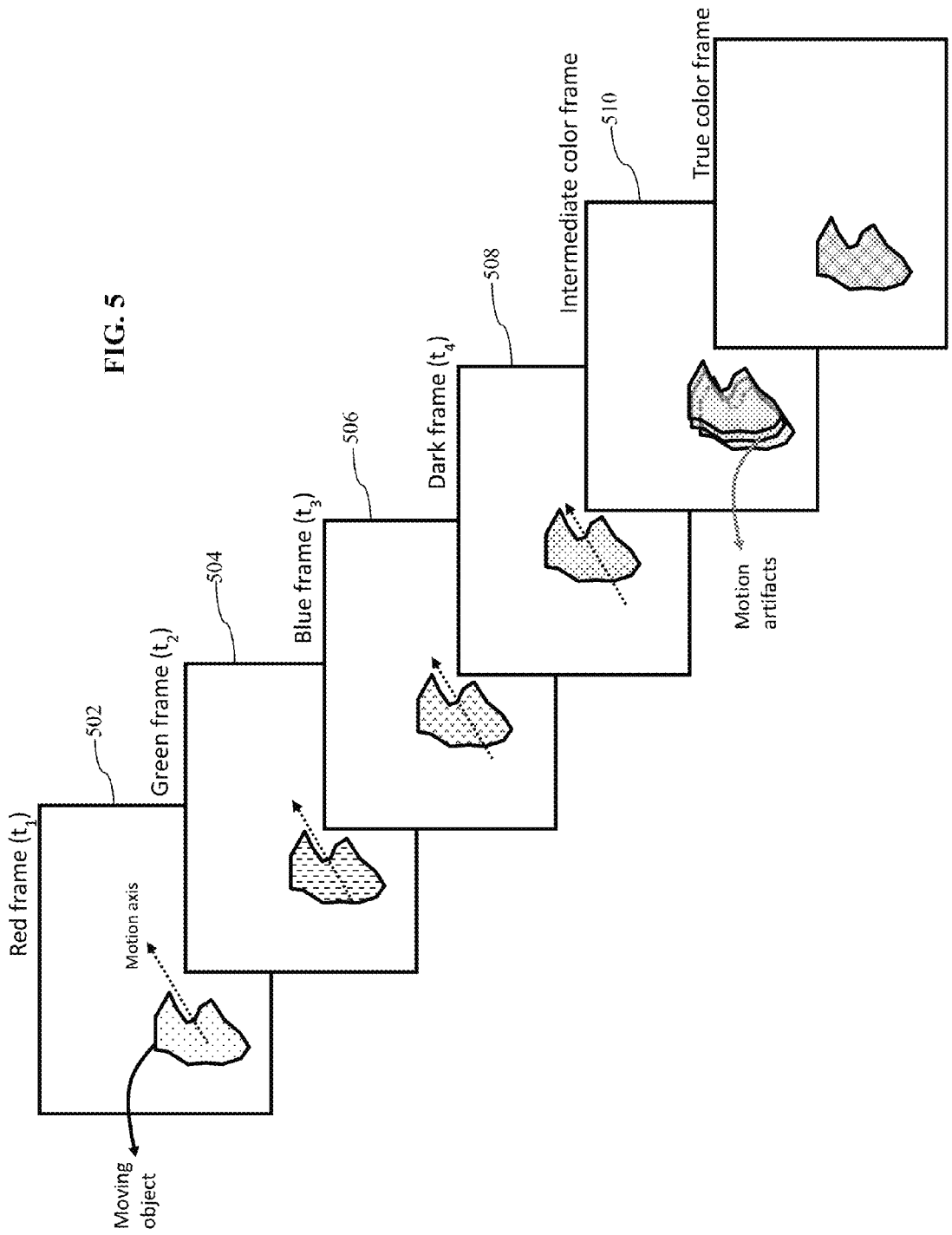
FIG. 5 is an exemplary illustration of color motion artifacts and compensation, according to some embodiments of the present invention.

FIG. 5 is an exemplary illustration of color motion artifacts and compensation, according to some embodiments of the present invention. A colored object moving along the direction, as illustrated by the motion axis, is imaged with the proposed invention. The R, G, and B frames shown detect the amount of red, green, and blue spectrum of the scene by turning on R, G, and B LEDs sequentially. The D frame is recorded by turning off all LEDs. An intermediate color frame is then obtained after compensating the R, G, and B frames with D frame, and by representing these compensated frames in a desired color space. Due to object motion, the position of the object in the R, B, G, and D frames is not the same. As a result, the intermediate color frame is seen to exhibit color artifacts along the edges of the object. After detecting moving regions and replacing them with their true colors, a true color frame is generated. The true color frame thus generated does not exhibit motion artifacts.

Figure 6:
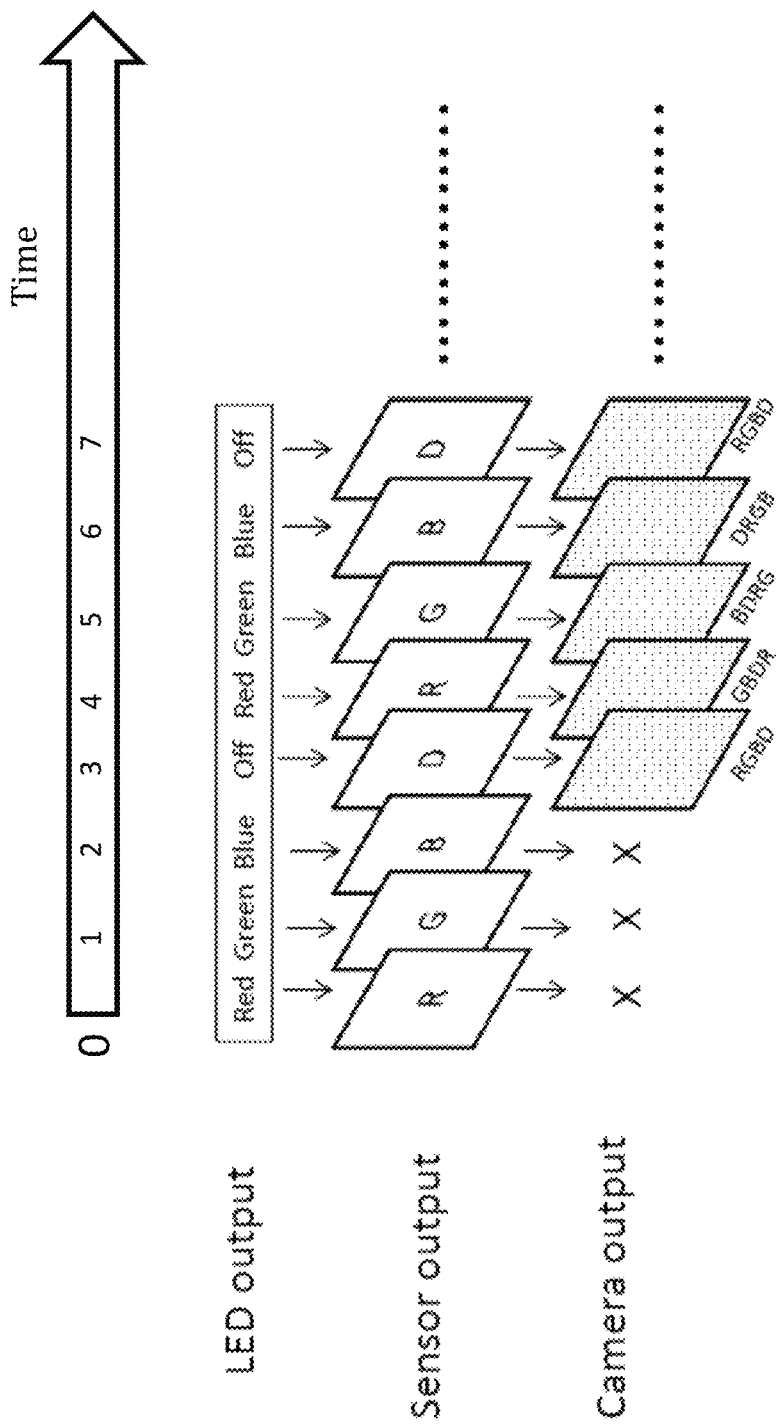
FIG. 6 depicts an exemplary frame rate pipeline diagram, according to some embodiments of the present invention.

The multispectral illumination and capturing of different R, G, and B frames of the present invention do not result in any frame rate reduction, as shown in FIG. 6, which depicts an exemplary frame rate pipeline diagram, according to some embodiments of the present invention. As shown, the multispectral illuminator of the present invention emits a different color (and optionally an off output), which results in capturing (detecting) a different color frame (R, G, B, and D) at the output of the image sensor. As illustrated, at any given time, a current frame is combined with previous three frames to generate the true color image frame. For example, the camera output at time t=3, includes a combined frame of R, G, B and D, in which R frame was captured at time 0, G frame at time 1 and D frame at time 3. Subsequent to time 3, the camera output pipeline is filled and thus produces a true color image frame at each time (frame) interval. At time 4, G (t=1), D(t=2), B(t=3), and R(t=4) frames are used to generate the true color frame. Accordingly, the frame rate of the present invention is identical to the image sensor frame rate, as shown.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for enhanced color imaging in a low light environment, the method comprising:

illuminating a first color, a second color, and a third color light at different time periods;

capturing a first color image frame, a second color image frame and a third color image frame, in response to the illumination;

determining moving pixels in each of the color image frames;

generating a true color frame for each of the color image frames by substituting respective colors of the moving pixels with respective majority colors of the moving pixels, in each of the color image frames; and adaptively adjusting illumination of one or more of the first, second, and third color lights to enhance color quality of a next true color frame.

2. The method of claim 1, wherein the first color is red, the second color is blue, and the third color is green.

3. The method of claim 1, wherein the first color is yellow, the second color is magenta, and the third color is cyan.

4. The method of claim 1, further comprising turning off the illumination of the first, second and third lights for a time period to generate a dark (D) frame; and subtracting the D frame from each of the first, second, and third color image frames to compensate for ambient lighting.

5. The method of claim 1, wherein determining moving pixels comprises subtracting a current color image frame for a given color from a previous color image frame of the same given color to identify the pixels that are present in the current color image frame, but not in the previous color image frame.

6. The method of claim 5, further comprising using a threshold value to separate moving pixels from non-moving pixels in a given color image frame, wherein the threshold value is determined based on an amount of noise present in the given color image frame.

7. The method of claim 1, wherein the majority color of the moving pixels is determined by determining a majority color of a moving pixels' non-moving neighborhood.

8. The method of claim 7, wherein a final size of the non-moving neighborhood is determined by adaptively varying a current size of the non-moving pixels' neighborhood until a statistically significant value for the majority color of the moving pixels is determined.

9. The method of claim 7, wherein a final size of the non-moving neighborhood is determined by increasing a current size of the non-moving pixels' neighborhood until a predetermined number of non-moving pixels with similar colors are detected.

10. The method of claim 1, further comprising calculating scene color metrics for each of the true color frames that quantifies a spectral profile of a scene in a respective true color frame; and adaptively adjusting said illumination responsive to said scene color metrics.

11. The method of claim 10, wherein calculating scene color metrics comprises calculating scene color statistics including a total number and energy of said first, second and third colors.

12. The method of claim 1, wherein adaptively adjusting illumination comprises adaptively adjusting a sensor exposure time.

13. The method of claim 1, wherein adaptively adjusting illumination comprises adaptively adjusting one or more of brightness, and duty cycle of one or more of said first, second and third color lights.

14. The method of claim 1, further comprising enhancing resolutions of the true color frames.

15. A camera for enhanced color imaging in a low light environment comprising:

a lens;

one or more illuminators for illuminating a first color, a second color, and a third color lights at different time periods;

an image sensor for capturing a first color image frame, a second color image frame and a third color image frame, in response to the illumination; and a processor for determining moving pixels in each of the color image frames; generating a true color frame for each of the color image frames by substituting respective colors of the moving pixels with respective majority colors of the moving pixels, in each of the color image frames; and adaptively adjusting illumination of one or more of the first, second, and third color lights to enhance color quality of a next true color frame.

16. The camera of claim 15, wherein a field of view of each of the one or more of illuminators is matched to a field of view of the lens.

17. The camera of claim 15, wherein the processor turns off the one or more illuminators for a time period to generate a dark (D) frame, and subtracts the D frame from each of the first color image frame, the second color image frame and the third color image frame to compensate for ambient lighting.

18. The camera of claim 15, wherein the processor adaptively adjusts illumination of one or more of the first, second, and third color lights by adaptively adjusting an exposure time of the image sensor.

19. The camera of claim 15, wherein the processor adaptively adjusts illumination of one or more of the first, second, and third color lights by adaptively adjusting one or more of brightness, and duty cycle of the colors of the first color, second color, and third color lights.

* * * * *